USA005610783A

United States Patent [19]

Maffitt et al.

[11] Patent Number: 5,610,783
[45] Date of Patent: Mar. 11, 1997

[54] INSULATOR PATTERN FOR THIN FILM HEAD SLIDERS

[75] Inventors: Kent N. Maffitt, Lake Elmo; Beat G. Keel, Prior Lake, both of Minn.

[73] Assignee: Seagate Technology, Inc., Scotts Valley, Calif.

[21] Appl. No.: 436,499

[22] Filed: May 8, 1995

Related U.S. Application Data

[63] Continuation of Ser. No. 231,399, Apr. 22, 1994, abandoned.

[51] Int. Cl.$^6$ .................................................. G11B 5/60
[52] U.S. Cl. ............................................................ 360/103
[58] Field of Search .................................... 360/103, 104, 360/105, 110, 125, 126, 121; 29/603

[56] References Cited

U.S. PATENT DOCUMENTS

| | | | |
|---|---|---|---|
| 4,789,914 | 12/1988 | Ainslie et al. | 360/103 |
| 4,992,897 | 2/1991 | Deroux-Dauphin | 360/103 |
| 5,020,213 | 6/1991 | Aronoff et al. | 360/103 |
| 5,068,759 | 11/1991 | Matsuzaki | 360/103 |
| 5,126,901 | 6/1992 | Momoi et al. | 360/103 |
| 5,220,471 | 6/1993 | Matsuzaki | 360/103 |
| 5,293,288 | 3/1994 | Ishikawa et al. | 360/103 |

OTHER PUBLICATIONS

IBM Technical Disclosure Bulletin (vol. 15, No. 7, Dec. 1972).
IBM Technical Disclosure Bulletin (vol. 14, No. 7, Dec. 1972).

*Primary Examiner*—Stuart S. Levy
*Assistant Examiner*—Allen Cao
*Attorney, Agent, or Firm*—Kinney & Lange, P.A.

[57] ABSTRACT

A thin film magnetic head includes a slider having a first air bearing surface and a second surface made of a layer of an insulating material. The second surface has a first aperture formed in the insulating layer to expose a portion of the slider below the second surface layer. A reading/writing transducer is provided in the slider adjacent to the air bearing surface and has a first connecting link extending within the slider so that an end of the first link is exposed within the first aperture of the second surface layer. A first bond pad extends on the second surface of the slider and within the first aperture of the second surface layer. The first bond pad is electrically connected to the exposed end of the first link of the read/write transducer within the first aperture of the second surface layer.

10 Claims, 5 Drawing Sheets

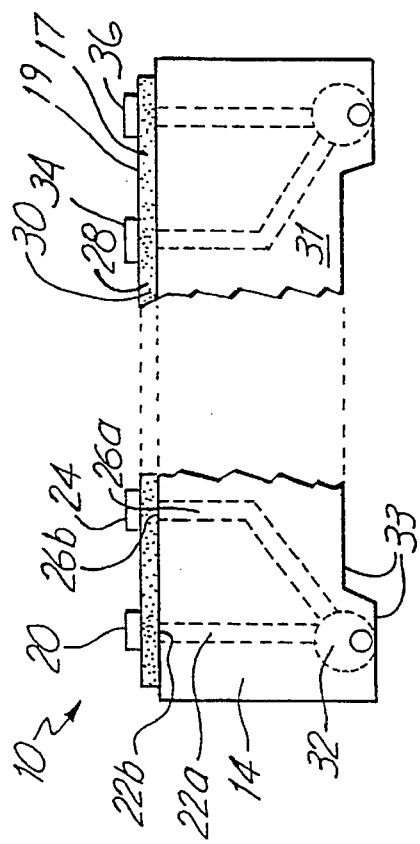
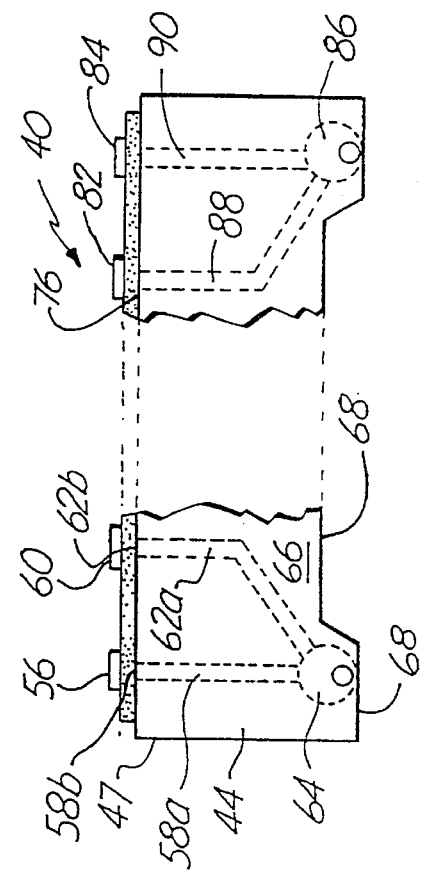

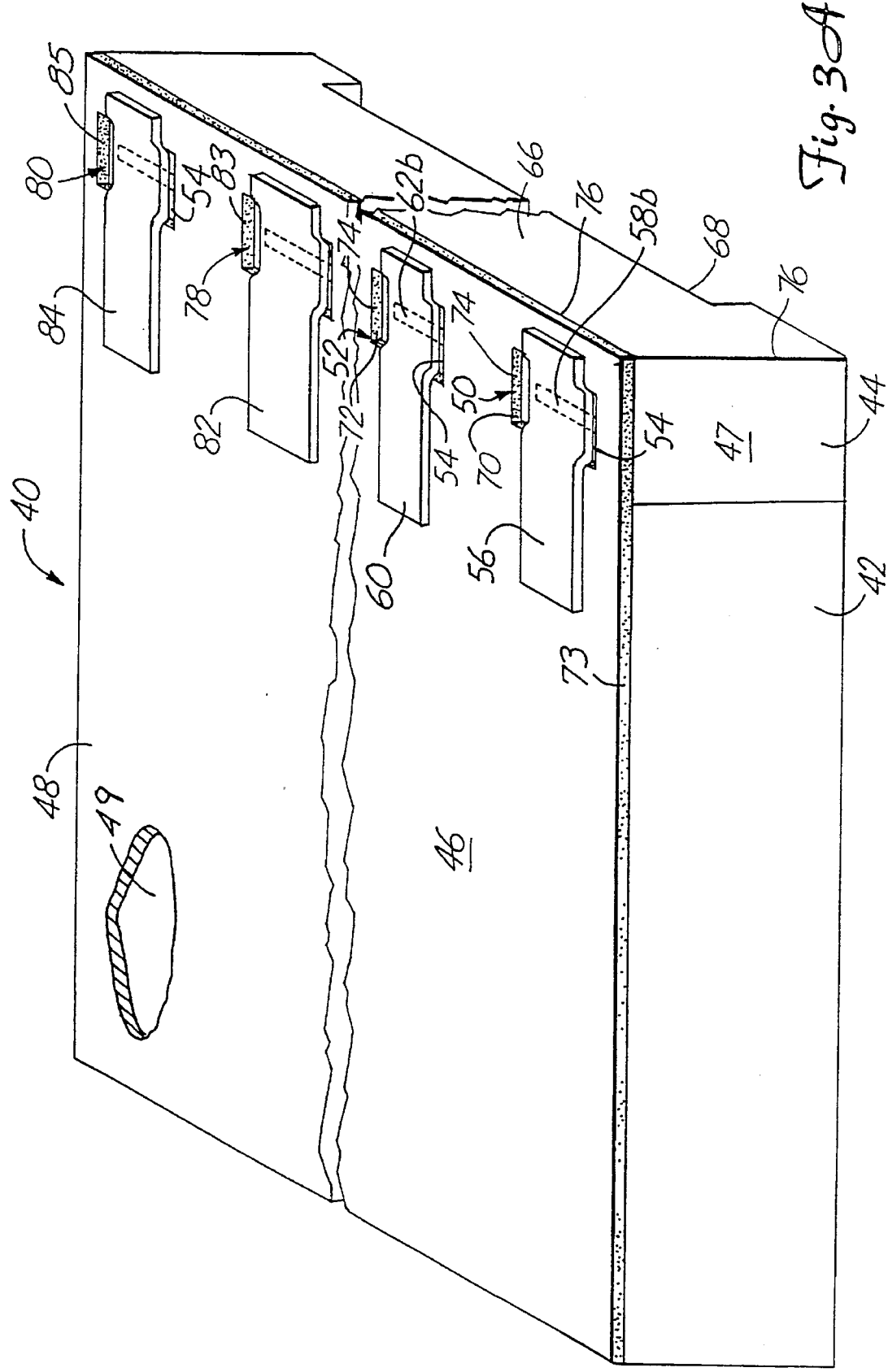

INSULATOR PATTERN FOR THIN FILM HEAD SLIDERS

This is a Continuation of application Ser. No. 08/231,399, filed Apr. 22, 1994, now abandoned. Priority of the prior application is claimed pursuant to 35 USC § 120.

BACKGROUND OF THE INVENTION

The present invention relates to a flying type thin film magnetic head of a disc drive. In particular, the present invention relates to a top surface insulating layer of a thin film magnetic head slider.

Conventional thin film magnetic heads typically have a write/read transducer provided on a trailing end surface of the magnetic head slider. Each write/read transducer includes several bond pads located on a trailing end surface of the slider. The bond pads are provided for electrically connecting the read/write transducer with connecting wires extending from the control circuitry of the disc drive. However, providing the bond pads on the trailing end surface of the slider becomes a limiting factor on miniaturization of the magnetic head slider because connecting wires from the control circuitry need to be secured to the bond pads on the trailing end surface of the slider. This is a difficult, time consuming, and expensive process because of the small surface area available on the trailing end surface of the slider for making the electrical connections between the connecting wires and the bond pads. Moreover, in addition to this difficult electrical connection, a separate mechanical connection is required to connect the slider with the support arm carrying the slider.

FIG. 1 of the Ainslie et al. U.S. Pat. No. 4,789,914 illustrates a typical prior art configuration. However, the Ainslie et al. patent also discloses a thin film magnetic head head/slider in which the top surface of the slider includes a pair of contact pads 39 (see FIG. 3 of Ainslie patent) adapted for mechanically connecting the support arm with the slider and for electrically connecting the control circuitry of the disc drive with the connecting links from the read/write transducer. The read/write transducer is adjacent the trailing end surface of the slider and adjacent the air bearing surface of the slider. The solder contact pads 39 are connected to the read/write transducer and replace bond pads which were previously provided on the trailing end surface of the head/slider for electrical connection with connecting wires from the control circuitry.

Although placing solder contact pads 39 on a top surface of the slider provides a simpler mechanical and electrical connection, this design presents problems associated with signal quality resulting from ineffective electrical isolation between conductive components. In particular, the substrate of a slider is a conductive material and comprises a majority of the body of a slider. The contact pads 39 are also conductive and therefore must be electrically isolated from the conductive substrate of the slider. Accordingly, as shown in FIG. 10 of the Ainslie patent, an insulating layer 17 was introduced on top of substrate 1 and over a substantial length of the slider except for the trailing end portion of the slider adjacent the connecting posts 11 (connected to the read/write transducer). The insulating layer 17 has a terminal edge adjacent and positioned over the posts 11. This edge of the insulating layer in most prior art sliders typically extends across a full width of the slider.

Despite the introduction of the insulating layer 17, poor electrical isolation can occur between the contact pads and the conductive substrate 1 in a slider assembly like that of the Ainsle patent. In addition, poor electrical isolation can occur between separate contact pads (extending on the top surface of the slider over the insulating layer). These problems of electrical isolation are primarily caused by the configuration of the insulating layer formed on the top surface of the slider.

A prior art slider is provided in FIGS. 1 and 2 of this application to illustrate the problems caused by the current prior art configuration of the top surface insulating layer of the Ainslie-type slider. In particular, a prior art slider 10 shown in FIGS. 1 and 2 includes a conductive substrate 12 and a trailing end insulator 14 made of an alumina insulating material. An insulator 16 (analogous to layer 17 in the Ainslie patent) is provided on a top surface 15 of the substrate 12 and over the trailing end insulator 14 to form a top surface 19 of the slider 10. The insulator 16 includes a terminal edge 17 extending across the width of the slider and a side edge 18 extending along the length of the slider. A first bond pad 20 (analogous to the combination of layer 21 and 25 forming part of contact pads 39 as seen in FIG. 15 of the Ainslie patent) extends across a surface of the insulator 16 and across a top surface of the trailing end insulator 14. The first bond pad 20 is electrically connected to a first connecting link 22a (FIG. 2) (analogous to posts 11 in FIG. 15 of the Ainslie patent) extending up through the trailing end insulator 14, with the first link 22a having an end 22b exposed on the top surface of the trailing end insulator 14. A second bond pad 24 extends along a surface of the insulator 16 and on a top surface of the trailing end insulator 14. The second bond pad 24 is electrically connected to a second connecting link 26a which extends up through, and has an end 26b exposed on the top surface of, trailing end insulator 14.

The insulator 16 electrically isolates the conductive first bond pad 20 and the conductive second bond pad from the conductive substrate 12.

As shown in FIG. 2, the slider 10 includes a read/write inductive-type transducer 32 disposed below an end surface 31 of the slider 10 within trailing end insulator 14 adjacent an air bearing surface 33 of the slider. The first link 22a and second link 26a are electrically connected to the transducer 32.

Optimum operation of the read/write transducer 32 requires a high degree of electrical isolation between: conductive first bond pad 20 and the conductive substrate 12; conductive second bond pad 24 and the conductive substrate 12; and conductive first bond pad 20 and conductive second bond pad 24. However, this desired electrical isolation cannot always be achieved because a conductive metallic seed layer residue 28 sometimes remains after fabrication of first bond pad 20 and second bond pad 24, and can partially cover an edge surface 30 of the terminal edge 17 and the side edge 18 of the insulator 16. This conductive seed layer residue can reduce the impedance between respective bond pads 20 and 24 hampering the desired electrical isolation therebetween.

The conductive metallic seed layer (not shown) is used as an intermediate step to facilitate electroplating the bond pads 20 and 24. In the intermediate step, the seed layer is deposited over the entire top surface of the slider including the insulator 16, first link end 22b and second link end 26b, and the top surface of the trailing end insulator 14. After fabrication of the bond pads 20, 24, 34 and 36 (by electroplating conductive bonding material on the seed layer), any exposed seed layer is removed to yield the configuration shown in FIGS. 1 and 2. However, the current processes such as wet etching, sputter etching, and ion milling are not capable of reliably removing all of the exposed seed layer, and residual traces 28 of the seed layer thus remains on the edges 18 and 30 of the insulator 16. The seed layer residue 28 degrades the desired electrical isolation between the electrically active components, i.e., the bond pads and the substrate. In particular, the seed layer residue 28 can provide an unwanted electrical connection between bond pads 20 and 24, between first bond pad 20 and substrate 12, or between second bond pad 24 and substrate 12.

However, the seed layer residue alone does not cause the electrical isolation difficulties. Rather, the terminal edge 17 of the insulator layer 16 primarily creates the electrical isolation problems because the edge surface 30 of the terminal edge 17 is common to several separate conductive components. As seen in FIG. 1, the edge surface 30 is common to the conductive substrate 12, the conductive bond pads 20 and 24 as well as any other conductive bond pads such as bond pads 34 and 36. This commonality of edge surface 30 with all of the respective conductive components permits the conductive seed layer residue 28 on the edge surface 30 of edges 17 and 18 to degrade the desired high impedance between the respective conductive components, namely, the substrate 12 and bond pads 20, 24, 34 and 36.

Placing bond pads of a read/write transducer on a top surface of a slider provides considerable advantages. However, it is desirable to modify the currently known assembly of the top surface of the head/slider, particularly the top surface insulating pattern, to overcome the problems of ineffective electrical isolation between conductive bond pads such as bond pads 20 and 24, and between each of the respective conductive bond pads and the conductive substrate 12. These isolation problems are caused by the edge surface 30 of the insulator 16 being common to each respective electrically active components (e.g., substrate 12, bond pads 20 and 24) such that the conductive seed layer residue 28 on the edge surface 30 of edges 17 and 18 of insulator 16 degrades the desired high impedance between the respective electrically active components.

SUMMARY OF THE INVENTION

A magnetic head assembly of the present invention includes a top surface insulating layer (over a conductive substrate) wherein the insulating layer has a plurality of discrete closed loop edge surfaces, each closed loop edge surface being isolated from any other closed loop edge surface of the insulator. This prevents an edge surface of the insulating layer in contact with a first conductive component of the slider from being common with an edge surface of the insulating layer in contact with a second conductive component of the slider. This top surface insulating layer pattern of the present invention maintains electrical isolation between the respective bond pads of a write/read transducer and between the respective bond pads and a substrate of the slider despite any seed layer residue on the edge surfaces of the top surface insulating layer.

In one embodiment, a thin film magnetic head of the present invention comprises a slider having a first air bearing surface and a second surface made of a layer of an insulating material. The second surface has a first aperture formed in the insulating layer to expose a portion of the slider below the second surface layer. A read/write transducer is provided in the slider adjacent to the air bearing surface and has a first connecting link extending within the slider so that an end of the first link is exposed within the first aperture of the second surface layer. A first bond pad extends on the second surface of the slider and within the first aperture of the second surface layer. The first bond pad is electrically connected to the exposed end of the first link of the read/write transducer within the first aperture of the second surface layer.

The first aperture defines a closed loop edge surface of the insulating layer surrounding the connection between the first link and the first bond pad. This closed loop edge surface of the first aperture is electrically isolated from, and is not common with, any other edge surface of the insulating layer. The edge surface of the insulating layer is configured such that any edge surface of the insulating layer that is in contact with a first electrically active component, e.g., the first bond pad, is isolated from, i.e., not in common with, any edge surface of the insulating layer in contact with a separate electrically active component, e.g., the substrate or a second bond pad. The first aperture is of sufficient size only to permit the electrical connection between the first bond pad and the end of the first link.

The second surface layer can include a second aperture and the read/write transducer can include a second connecting link extending within the slider to have an end of the second link exposed within the second aperture of the second surface layer. A second bond pad extends on the second surface and has a portion extending within the second aperture. The second bond pad is electrically connected with the end of the second link of the read/write transducer within the aperture of the second surface layer. A closed loop edge surface defining a periphery of the second aperture is electrically isolated from, i.e., not in common with, the closed loop edge surface of the first aperture. Additional bond pads and connecting links may be similar connected such that any edge surface of the insulating layer in contact with an electrically active or conductive component, e.g., first bond pad, is isolated, i.e., not in common with, an edge surface of the insulating layer in contact with a separate electrically active component.

The present invention may be incorporated for both magneto resistive-type transducers as well as inductive-type transducers. The configuration of the insulating layer of the slider of the present invention precludes an edge surface of the insulating layer being in common with two or more electrically active or conductive components. This insulating layer pattern provides the desired electrical isolation between the respective bond pads, and between each of the respective bond pads and the substrate of the slider despite any seed layer residue left over from the fabrication of the bond pads on the second surface of the slider.

BRIEF DESCRIPTION OF THE DRAWINGS

FIG. 2 is an end view of the prior art thin film magnetic head slider of FIG. 1.

FIG. 3A is a perspective view of the thin film magnetic head of the present invention for an inductive-type transducer.

FIG. 4 is an end view of the thin film magnetic head of the present invention shown in FIG. 3A.

Figure 1:
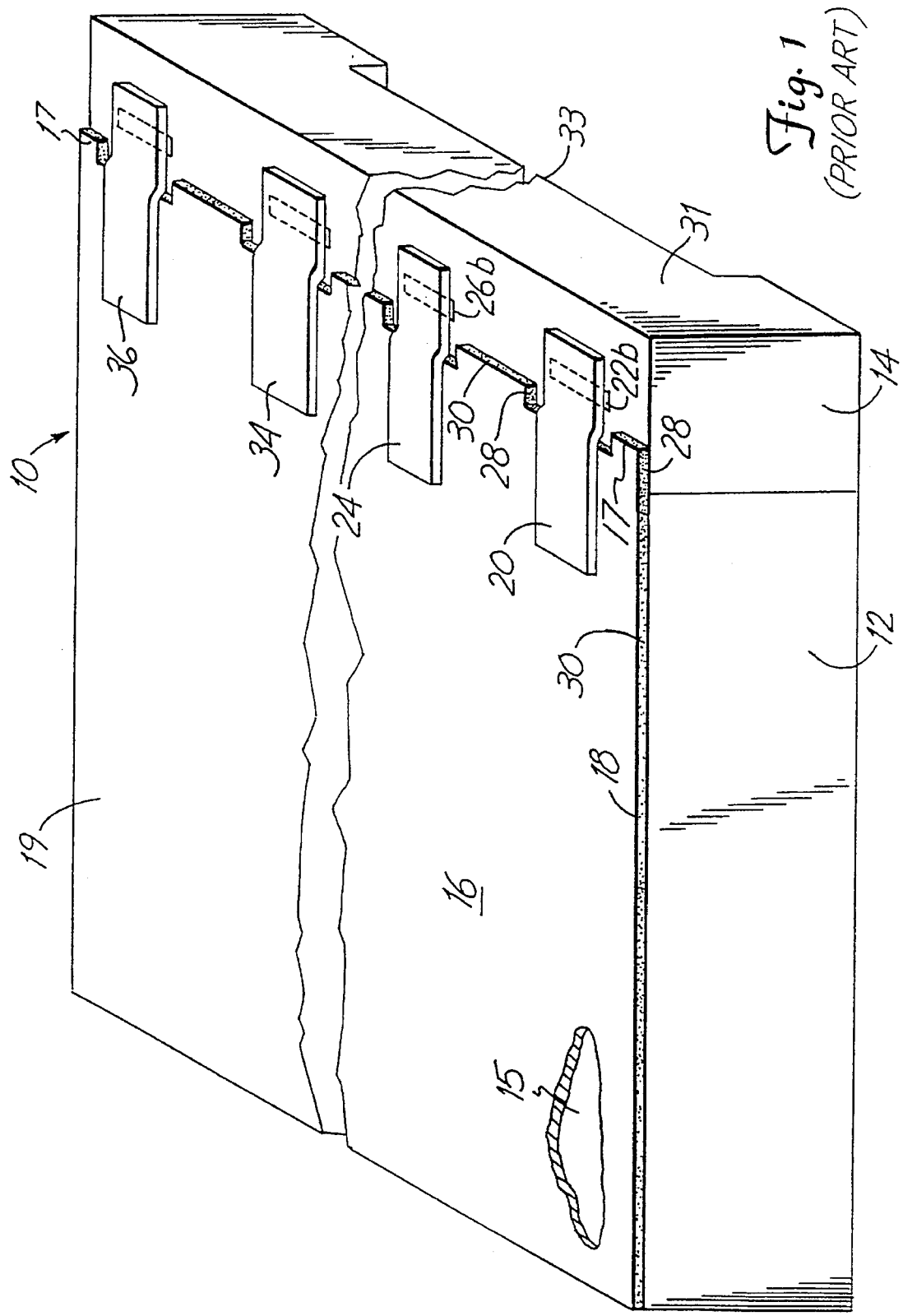
FIG. 1 is a perspective view of a prior art thin film magnetic head slider including top bond pads for an inductive-type transducer.

While the above-identified figures set forth the preferred embodiments, other embodiments of the present invention are also contemplated as noted in the discussion. In all cases, this disclosure presents illustrated embodiments of the present invention by way of representation and not limitation. Numerous other modifications and embodiments can be devised by those skilled in the art which fall within the scope and spirit of the principles of this invention. The figures have not been drawn to scale as it has been necessary to enlarge certain portions for clarity. In addition, the use of such relational terms such as left/right, upper/lower, top/bottom or horizontal/vertical etc. are used herein for reference purposes only and are not intended to be limiting features of the invention disclosed.

DETAILED DESCRIPTION OF THE PREFERRED EMBODIMENTS

The thin film magnetic head slider of the present invention is illustrated in FIG. 3A generally at 40. The slider 40 includes a substrate 42 and a trailing end insulator 44. An insulating layer 46 is provided over both a top surface 49 of the substrate 42 and a top surface of the trailing end insulator 44, thereby forming a top surface 48 of the slider 40. The insulating layer 46 includes a first aperture 50 formed therein and a second aperture 52 formed therein to expose selected portions of a top surface 54 of the trailing end insulator 44. A first bond pad 56 extends along the top surface of the insulating layer 46 and through first aperture 50 onto the surface 54 of the insulator 44. The bond pad 56 is electrically connected to a first connecting link 58*a*. As seen in FIG. 4, first link 58*a* extends up through the insulator 44 and an end 58*b* of first link 58*a* is exposed on the surface 54 of the insulator 44 for connection with the bond pad 56. A second bond pad 60 extends along the top surface of the insulating layer 46 and through second aperture 52 onto the surface 54 of the insulator 44 and is electrically connected with a second connecting link 62. A second link 62*a* extends up through the insulator 44 and an end 62*b* of second link 62*a* is exposed on a surface 54 of the insulator 44 for electrical connection with the bond pad 60.

The insulating layer 46 insulates the conductive substrate 42 from the conductive bond pads 56 and 60. The first bond pad 56 extends within first aperture 50 of the insulator 46 for electrical connection with the link 58*a* and the second bond pad 60 extends within the second aperture 52 of insulator 46 for electrical connection with the link 62*a*.

As shown in FIG. 4, the slider 40 includes at least one read/write inductive-type transducer 64 disposed below an end surface 66 of the slider 40 within the trailing end insulator 44 adjacent an air bearing surface 68 of the slider. The first link 58*a* and second link 62*a* are electrically connected to the transducer 64.

Figure 3B:
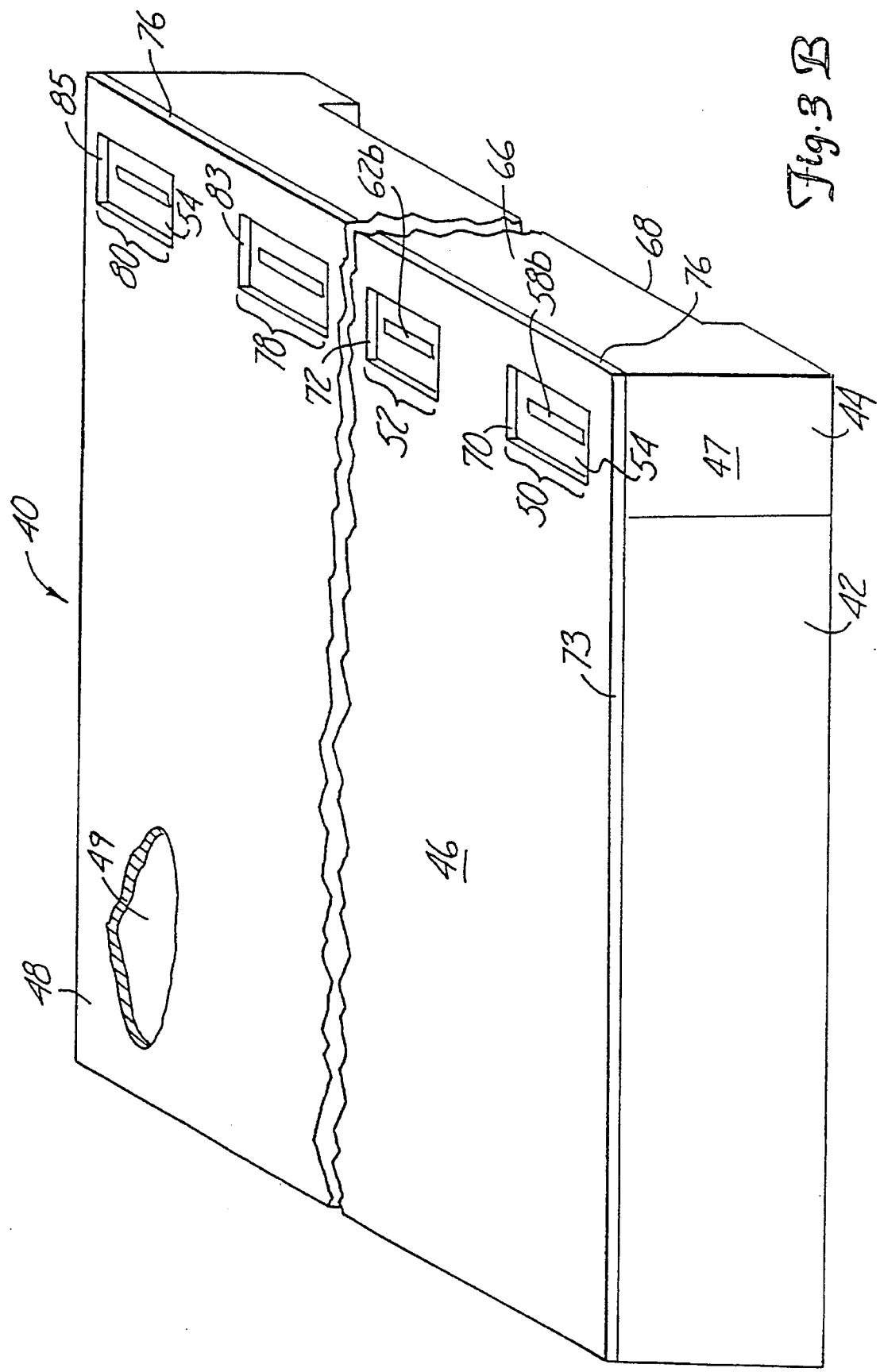
FIG. 3B is a modified perspective view of the thin film magnetic head of FIG. 3A showing top bond pads removed from a top surface.

As seen in FIG. 3A and FIG. 3B (showing top bond pads 56 and 60 removed for illustrative purposes), the first aperture 50 and the second aperture 52 of insulator layer 46 includes a closed loop edge surface 70 and a closed loop edge surface 72, respectively. The edge surface 70 of the aperture 50 is electrically isolated from, i.e., not in common with, the edge surface 72 of the aperture. Typically, a seed layer residue 74 is created during the fabrication of the bond pads 56 and 60 on the slider 40 and rests on the edge surface 70 and edge surface 72. The seed layer residue 74 is a conductive metal that remains on the edge surfaces 70 and 72 despite removal of the seed layer by conventional wet etching, sputter etching, or ion milling techniques from the top surface 48 of insulator 46.

However, the pattern of the insulating layer 46 of the present invention electrically isolates an edge surface 70 of the insulating layer 46 (in contact with the conductive first bond pad 56) from the edge surface 72 of the insulating layer 46 (in contact with the conductive second bond pad 60). With this arrangement, an edge surface of the insulator layer 46 has been "broken up" so that no single edge surface of the insulator layer can be common to two or more electrically active or conductive components. Accordingly, any residue 74 formed along an edge surface of the insulating layer 46 does not contaminate or degrade the desired electrical isolation between the first bond pad 56 and second bond pad 60. Rather, the configuration of the insulating layer 46 insures electrical isolation between the substrate 42 and the first bond pad 56, and between the second bond pad 60 and the substrate 42, because a side edge surface 73 of insulator 46 is not common with the edge surfaces 70 and 72.

In addition, although not required, the slider 40 can include another pair of apertures 78 and 80 in insulating layer 46 to receive a respective pair of bond pads 82 and 84 adapted for electrical connection to a second read/write transducer 86 via respective connecting links 88 and 90. The apertures 78 and 80, like apertures 50 and 52, define closed loop edge surfaces 83 and 85, respectively, such that the edge surface 83 of insulator 46 (in contact with bond pad 82) is not in common with the edge surface 85 of insulator 46 (in contact with bond pad 84). Moreover, although the apertures 50 and 52 are shown adjacent the trailing end surface 66 of slider 40, the apertures for receiving bond pads 56 and 60 can be located elsewhere on the insulating layer 46 on the top surface 48 of the slider 40 over the insulator 44. If need be, an insulating layer with aperture patterns analogous to those shown in FIGS. 3A and 4 can be formed on a side surface 47 of the slider 40 over the insulator 44 provided that any edge surface of an insulator in contact with an electrically conductive component is isolated from an edge surface of an insulator in contact with a separate electrically conductive component.

In addition to configuring the insulator 46 to have the desired isolated edge surfaces, the insulator 46 can be shaped so that the edge surfaces of the insulator 46 are sloped toward the conductive components. The slope of the edge surface further facilitates removal of the seed layer from the top insulator layer edge surfaces during fabrication of the slider components.

The pattern of insulator 46 including the closed loop edge surfaces 70 and 72 defining the apertures 50 and 52, respectively, (and, if desired, further apertures 78 and 80) is constructed by conventional techniques known to those skilled in the art in manufacturing thin film heads. To manufacture the thin film head slider 40 of the present invention, the slider 40 is first cut from a wafer made by conventional techniques. The wafer includes two basic layers: a substrate 42 and an aluminum oxide basecoat and overcoat forming a trailing end insulator 44 deposited on the substrate 42. After the wafer is cut into individual sliders such as a slider 40 (comprising the substrate 42 and insulator 44), an insulating material, such as aluminum oxide, is sputter deposited over the substrate 42 and insulator 44 to form the layer of insulating material 46 and top surface 48 of the slider 40. Conveniently, a natural cleavage in the insulating material is generated during deposition of the insulator layer 46 such that layer 46 terminates cleanly and flush with the insulator 44 at edge 76.

Next, a photo resist layer (not shown) is deposited over the insulating layer 46 and subsequently exposed and developed to leave an aperture pattern in the photo resist layer in a region approximately corresponding to the later formed apertures (e.g., apertures 50 and 52). The insulating layer 46 is then sputter etched, wet etched, or ion milled to remove the insulating material 46 to form the desired apertures (e.g., apertures 50 and 52) in the selected region of the exposed photo resist layer. In particular, the insulating layer 46 is removed to uncover that portion of the top surface 54 of insulator 44 over the end 58b and end 62b of the respective first and second links 58a and 62a. The photo resist layer is then removed from the insulating layer 46 using conventionally known techniques.

This pattern results in the creation of several edge surfaces of the insulator layer 46 (defined by the apertures) which are not common with each other, as shown in FIG. 3B.

The next major step in fabricating the slider 40 includes sputter depositing a conductive metallic seed layer over the entire top surface of the slider including the top surfaces of the insulator 46, first link end 58b, second link end 62b and top surface 54 of insulator 44. The metallic seed layer is preferably a chromium permalloy or other suitable seed layer materials including: chromium and copper; chromium, copper, and gold; copper and molybdenum; copper and tungsten; and other suitable combinations. After depositing the seed layer, a photo resist layer is deposited over the seed layer. The photo resist layer is then subsequently exposed and developed to uncover the seed layer in the regions of the to-be-formed bond pads 56 and 60.

Next, a layer of copper, gold, or nickel is plated onto the uncovered portions of the seed layer to form conductive bond pads 56 and 60. After formation of the bond pads 56 and 60, the photo resist layer is removed from the surfaces of the slider 40 and then the seed layer is removed using wet etching techniques or, if desired, sputter etching, ion milling, or plasma etching techniques. After this last step, fabrication of the top surface 48 of the slider 40 is complete yielding the assembly shown in FIG. 3A.

However, as previously noted, this technique can leave a conductive seed layer residue 74 on the edge surfaces 70 and 72 of the respective first and second apertures 50 and 52. Nonetheless, as previously explained, the pattern of the insulating layer 46 of the present invention negates problems previously associated with seed layer residue in the prior art assembly. The insulating layer 46 is configured, in the form of apertures, to prevent an edge surface of the insulator 46 (in contact with a conductive component) from being common with another edge surface of the insulator 46 (in contact with a second conductive component). In particular, in the prior art assembly (see FIG. 1 and 2), the edge surface 30 of the insulator 16 was common to top bond pads 20 and 24 and the substrate 12. Because this edge surface 30 was common to each of the respective conductive components, the conductive seed layer residue 28 on the edge surface 30 could degrade the desired electrical isolation between the electrically conductive components.

The preferred material for the substrate 42 is a combination of an alumina material, i.e., aluminum oxide, and a titanium carbide. The alumina trailing end insulator 44 is preferably an aluminum oxide sputter deposited on the substrate 42. The connecting links 58a and 62a are preferably made from a gold or copper or permalloy material.

A slider of the present invention can be made for either magneto resistive or inductive-type read/write transducers.

FIGS. 3A and 4 illustrate a slider 40 of the present invention incorporating an inductive-type mad/write transducer 64. As shown in these figures, only two bond pads (56 and 60) are required for a single inductive-type transducer. Accordingly, only two apertures (50 and 52) are required to be formed within the insulating layer 46 to accommodate bond pads (56 and 60).

However, four bond pads are required for a single magneto resistive read/write transducer. Accordingly, four apertures (i.e., configurations of closed loop edge surfaces of the insulator) would be required in the insulating layer 46 of top surface of the slider to accommodate the four bond pads for connection to the connecting links of the magneto resistive transducer and to maintain the desired electrical isolation between each of the respective bond pads. An example of this configuration is shown in FIGS. 5 and 6.

Figure 5:
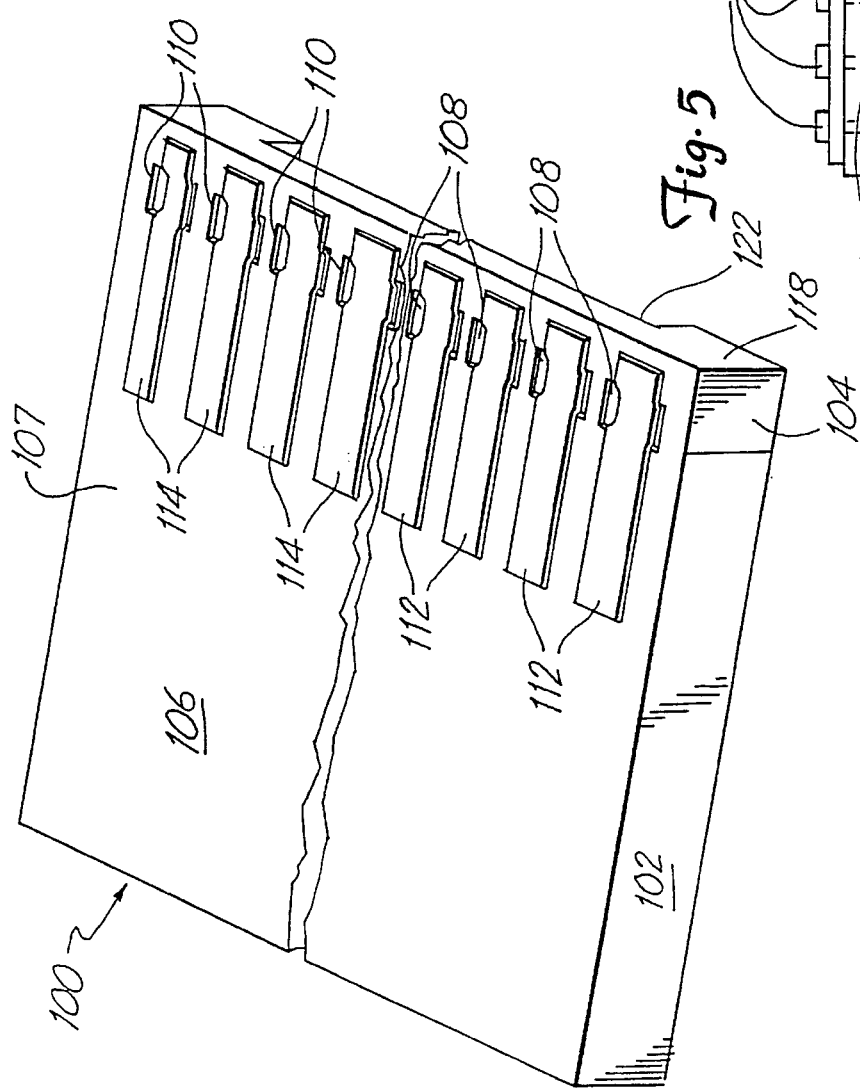
FIG. 5 is a perspective view of a thin film magnetic head slider of the present invention for a magneto resistive-type transducer.
Figure 6:
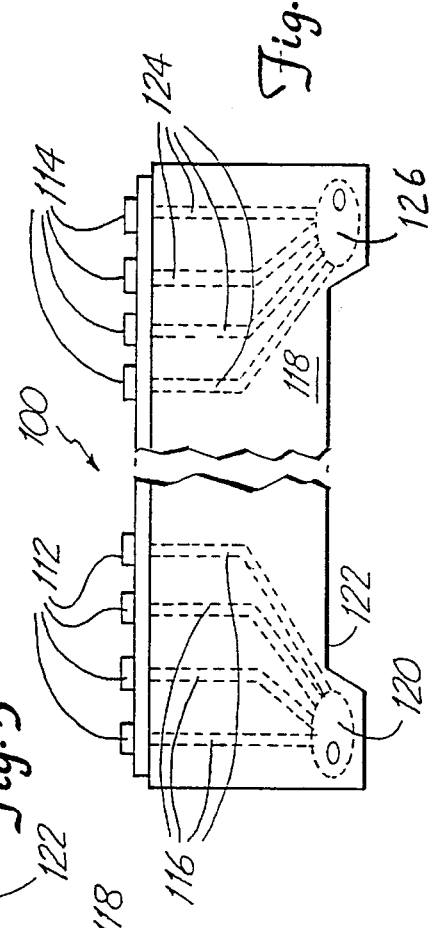
FIG. 6 is an end view of the thin film magnetic head slider shown in FIG. 5.

As shown in FIG. 5 and 6, a slider 100 of the present invention includes a substrate 102 and a trailing end insulator 104. An insulating layer 106 forms a top surface 107 of the slider 100. The slider 100 is similar to the slider 40 in manufacture and design except that the slider 100 includes two pairs of four apertures 108 and 110, respectively, formed in the insulating layer 106 to receive two sets of four bond pads, 112 and 114, respectively. The bond pads 112 are electrically connected individually to a respective matching set of connecting links 116 extending within the trailing end insulator 104 adjacent a trailing end surface 118 of the slider 100. The connecting links 116 extend from and are electrically connected to a magnetoresistive read/write transducer 120 disposed within the slider 100 adjacent an air bearing surface 122 of the slider 100. The other set of bond pads 114 are electrically connected individually to a respective matching set of connecting links 124 extending within the trailing end insulator 104 of the slider adjacent the trailing end surface 118 of the slider 100. The connecting links 124 extend from and are electrically connected to a magnetoresistive read/write transducer 126 disposed within the slider 100 adjacent the air bearing surface 122 of the slider 100. The slider 100 enjoys the same advantages (i.e., stable electrical connection and isolation) as the slider 40 previously described.

Of course, any number of apertures (or other patterns) can be formed in the top surface insulating layer of the slider of the present invention provided that any edge surface of the insulating layer in contact with a first conductive component (e.g., bond pad or substrate) is isolated from, i.e., not common with, any other edge surface of the top surface insulating layer in contact with a second conductive component.

A thin film magnetic head of the present invention has several advantages. First, the top bond pad magnetic head assembly of the present invention increases the available surface area for electrically connecting the magnetic head to the control circuitry of the disc drive and for mechanically connecting the magnetic head to the support arm and gimbal of the disc drive. Second, electrical isolation is insured between the respective conductive components, e.g., bond pads, and the substrate of the slider by providing a top surface insulating layer pattern with a plurality of discrete edge surfaces (associated with the conductive components) that are not common to each other, i.e., are isolated from each other.

Although the present invention has been described with reference to preferred embodiments, workers skilled in the art will recognize that changes may be made in form and detail without departing from the spirit and scope of the invention.

What is claimed is:

1. A thin film magnetic head comprising:

a slider having a conductive substrate and a layer of an insulating material on top of the conductive substrate, wherein the insulating layer is configured such that the insulating layer has a plurality of discrete closed loop edge surfaces wherein each closed loop edge surface is isolated from any other closed loop edge surface of the insulating layer including at least a first closed loop edge surface and a second closed loop edge surface isolated from the first closed loop edge surface, the first and second closed loop edge surfaces defining a first aperture and second aperture, respectively;

a transducer disposed within the slider and having a first and second connecting link extending within the slider with an end of the first connecting link being exposed within the first aperture and an end of the second connecting link being exposed within the second aperture;

a first conductive bond pad extending across the top of the insulating layer and down into the first aperture defined by the first closed loop edge surface, and extending upwardly out of the first aperture and onto the top of the insulating layer so that the first bond pad extends across the top of the insulating layer on opposite sides of the first aperture, the first bond pad being in contact with the first closed loop edge surface and electrically connected to the end of the first connecting link; and a second conductive bond pad extending across the top of the insulating layer and down into the second aperture defined by the second closed loop edge surface, and extending upwardly out of the second aperture and onto the top of the insulating layer so that the second bond pad extends across the top of the insulating layer on opposite sides of the second aperture, the second bond pad being in contact with the second closed loop edge surface and electrically connected to the end of the second connecting link.

2. The magnetic head of claim 1 wherein the insulating layer is a top surface of the slider on a side of the slider opposite an air bearing surface of the slider.

3. The magnetic head of claim 1 wherein the apertures of the insulating layer are arranged in a linear array adjacent a trailing end surface of the slider.

4. The magnetic head of claim 1 wherein the transducer is an inductive type read/write transducer.

5. The magnetic head of claim 1 wherein the transducer is a magnetoresistive type read/write transducer.

6. The thin film magnetic head of claim 1 wherein the first and second closed loop edge surface further include:

a first conductive seed layer residue extending on the first closed loop edge surface at least adjacent the point of contact between the first conductive bond pad and the first closed loop edge surface and a second conductive seed layer residue extending on the second closed loop edge surface at least adjacent the point of contact between the second conductive bond pad and the second closed loop edge surface.

7. The thin film magnetic head of claim 1 wherein the first aperture and the second aperture are aligned adjacent to each other along a line that is substantially perpendicular to a longitudinal axis of the slider body.

8. The thin film magnetic head of claim 7 wherein a longitudinal axis of the first and second bond pads are substantially parallel to each other and to the longitudinal axis of the slider body.

9. The head of claim 1 wherein the first and second bond pads are configured and arranged so that a majority of the length of the respective first and second bond pads is disposed on the top of the insulating layer on the first side of the respective first and second apertures, and a minority of the length of the respective first and second bond pads is disposed on top of the insulating layer on the second side of the respective first and second apertures, wherein the second side of the respective first and second apertures is closer to an end of the slider head than the first side of the respective first and second apertures.

10. A thin film magnetic head comprising:

a slider including a slider body portion having a conductive substrate portion and a nonconductive end portion, the slider body having an air bearing surface and a top surface on a side of the slider opposite the air bearing surface, the top surface being made of a layer of an insulating material which overlays the conductive substrate portion and the nonconductive end portion, the top surface layer having a first and second aperture formed in the insulating layer to expose a respective pair of portions of the nonconductive end portion of the slider below the top surface layer, the first and second apertures each defining a closed loop edge surface of the insulating layer;

a transducer disposed in the slider adjacent the air bearing surface within the nonconductive end portion of the slider and having a first and second connecting link extending within the slider so that an end of the first and second links is exposed, respectively, within the first and second apertures of the top surface layer;

a first conductive bond pad extending on the top surface of the slider on a first side of the first aperture, extending within the first aperture of the top surface layer, and extending on the top surface of the slider on a second side of the first aperture opposite the first side, the first bond pad being in contact with the closed loop edge surface of the first aperture and being electrically connected to the end of the first link of the transducer within the first aperture of the top surface layer; and a second conductive bond pad extending on the top surface of the slider on a first side of the second aperture, extending within the second aperture of the top surface layer, and extending on the top surface of the slider on a second side of the first aperture opposite the first side, the second bond pad being in contact with the closed loop edge surface of the second aperture and being electrically connected with the end of the second link of the transducer with the second aperture of the top surface layer.

* * * * *

UNITED STATES PATENT AND TRADEMARK OFFICE
CERTIFICATE OF CORRECTION

PATENT NO. : 5,610,783
DATED : March 11, 1997
INVENTOR(S) : Kent N. Maffitt, Beat G. Keel It is certified that error appears in the above-indentified patent and that said Letters Patent is hereby corrected as shown below:

Col. 1, lines 5-6, after "abandoned.", delete "Priority of the prior application is claimed pursuant to 35 U.S.C. §120."

Signed and Sealed this

Eighth Day of July, 1997

Attest:

BRUCE LEHMAN

*Attesting Officer*    *Commissioner of Patents and Trademarks*